2,946,686

PROCESS OF CONDITIONING AND DRYING GLUTAMIC ACID END LIQUOR

Kenneth M. Gaver, Preville, Quebec, and Allan Alfred Eisenbraun, Montreal, Quebec, Canada, assignors to The Ogilvie Flour Mills Co., Ltd., Montreal, Quebec, Canada, a corporation of Canada No Drawing. Filed Apr. 17, 1958, Ser. No. 729,066

9 Claims. (Cl. 99—14)

This application relates to processes for the conditioning and drying of glutamic acid end liquor.

In a usual process for the manufacture of glutamic acid from gluten substantially the following procedures are used:

(a) The gluten is hydrolyzed, using an acid, water, heat, agitation and pressure, thus forming an acid solution of amino acids;

(b) This acid solution of amino acids is partially neutralized with alkali and then filtered free of all humins which have formed during hydrolysis;

(c) The filtrate is further and completely neutralized with alkali and is concentrated;

(d) Crystallized salt including the salt formed by the neutralization is substantially removed;

(e) The solution is cooled so that some of the amino acids (excepting glutamic acid) precipitate, and these other amino acids are thereupon removed by filtration;

(f) The filtrate (which now has been purified by removing most of the salt and of the unwanted amino acids but still includes the glutamic acid) is then acidified to the isoelectric point of glutamic acid, whereupon the glutamic acid crystallizes;

(g) The glutamic acid crystals are filtered off leaving a mother liquor which is usually herein called "end liquor."

The end liquor obtained as a product in the manufacture of glutamic acid is a valuable adjunct in dry soup, gravy mixes, spice formulations and miscellaneous food uses. The composition of the end liquor varies according to concentration, plant operating efficiency and composition of the raw material. A fair average end liquor would have the following approximate composition.

| | Percent |
|---|---|
| Alanine | 1.2 |
| Ammonia | 1.4 |
| Arginine | 1.6 |
| Aspartic acid | 2.1 |
| Cystine | 0.6 |
| Glutamic acid | 2.0 |
| Glycine | 1.8 |
| Histidine | 1.2 |
| Isoleucine | 0.6 |
| Leucine | 1.2 |
| Lysine | 0.8 |
| Methionine | 0.7 |
| Phenylalanine | 1.6 |
| Proline | 6.6 |
| Serine | 2.4 |
| Threonine | 2.0 |
| Tryptophane | 0.0 |
| Tyrosine | 0.2 |
| Valine | 1.5 |
| NaCl | 22.5 |
| Water | approximate remainder |

It should be understood that the composition of the end liquor may vary for the reasons pointed out above but the general relationship of one component to another will remain in approximately the same order of magnitude as set out in the above analyzed composition.

The end liquor may be used for food without drying, but if it is to be shipped, it should, for readily understandable economic reasons, be dried before shipping. Moreover, because the optimum flavor benefit of the product is achieved at about pH 5.5 and because the end liquor as it comes from step (g) as set out above usually has a pH of about 3.0–3.2 which is too acidic for use in food products and which would be somewhat corrosive on drying equipment, we prefer to neutralize the end liquor before drying so that on drying the dry product will be produced at a pH of about 5.5.

We have found that when we neutralize the end liquor just as it is obtained from step (g) as set out above and then attempt to spray dry, the drying process is very erratic. Sometimes it will spray dry satisfactorily, but oftentimes it will not spray dry at all well.

One of the objects of our invention therefore is the provision of a new process of conditioning and drying glutamic acid end liquor.

A more specific object of our invention is the provision of a process of conditioning glutamic acid end liquor so that it will spray dry satisfactorily in all cases.

Further objects and features of our invention will be apparent from the following specification and claims.

In our experiments with glutamic acid end liquors, we have also found that there is an ether soluble slime present in such end liquors which varies in amounts approximating 0.20% of the total end liquor, more or less. While it seemed inconceivable that such a small amount of slime could interfere with the drying process, we separated this slime and attempted to determine its composition. It seemed to be a copolymer of amino acids or an insoluble or colloidally dispersed combination of amino acids with sugars, fats, other naturally occurring substances and possibly other substances created during the previous processing. The main components were glutamic acid, aspartic acid, tyrosine and leucine with a large predominant proportion being glutamic acid. The fact that this slime substance is soluble in ether indicates that it is a most unusual polymeric substance. We reasoned that connected with this ether soluble slime there was another slime insoluble both in water and in ether. Experiments confirmed this view.

Based on these discoveries and this reasoning, we experimented with processes of treating end liquor with agents (such as acids and alkalis) which would tend to hydrolyze this slime and break it down to its constituent parts. In all such experiments, the resulting material spray dried with the greatest of ease. We have discovered that we can condition and spray dry the end liquor remaining after the separation of glutamic acid in the process of manufacturing glutamic acid from gluten by the following steps so that operations are performed perfectly:

(a) Hydrolysis either by acid or alkali;

(b) Neutralization;

(c) Spray drying.

In the hydrolysis step above, especially if the hydrolysis is by alkali, we prefer to heat under the alkaline conditions (which also serves to reduce the ammonia content preferably to the 0.01–0.05% range or below) and preferably under vacuum to speed up the removal of such ammonia, and preferably at a low temperature to avoid cooked flavor development. As stated, we prefer however, to hydrolyze with alkali since, on theory, the slime which is causing the difficulty in spray drying has already in step (a) above been subjected to an attempt at acid hydrolysis during the step of hydrolyzing the initial gluten and has apparently resisted such attempt.

Following are working examples of the practice of our invention:

Example I

We secured 306 gallons of end liquor as it came from the glutamic acid filtration step (step g) of a commercial glutamic acid manufacturing process corresponding to that described as steps (a) to (g) in column 1 above. We adjusted this with 76.5 gallons of 50% NaOH to a pH of 10.8 We then warmed the mixture to 140° F. and held for 14 hours under vacuum to hydrolyze and to eliminate ammonia. We then diluted with 20 gal. of fresh water. We then neutralized to pH 5.5 with 75 gallons 23° hydrochloric acid. We then diluted to 41% dry substances as measured by the refractometer and finally sprayed dry. The drying process operated perfectly.

Example II

We repeated the above operation many times with end liquor secured from various batches of material being processed to obtain glutamic acid. In each case we used 306 gallons of end liquor and adjusted to pH 10.7–10.8 with caustic soda. The amount of caustic soda varied with the concentration of the end liquor and the amino acid distribution therein but was generally in the range of from 60 to 90 gallons 50% NaOH.

We warmed the adjusted end liquor to temperatures ranging from 100–175° F. during times ranging from 8–20 hours. We diluted the product with 20 gallons of fresh water in each case and neutralized to pH 5.5–5.6 with hydrochloric acid (usually requiring in the range of from 60–90 gallons 23° HCl), diluted to 41% dry substances as measured by the refractometer, and then sprayed dry. The drying process operated perfectly in each case.

Example III

We secured 306 gallons of end liquor as it came from the glutamic acid filtration step (step g) of a commercial glutamic acid manufacturing process corresponding to that described as steps (a) to (g) as set out in column 1 above. We adjusted this to a pH below 1.0 with 300 gallons 23° hydrochloric acid. We heated this mixture to 150–170° F. for 14 hours. We then neutralized with about 225 gallons of 50% NaOH. We then diluted to 41% dry substances as measured by the refractometer and finally sprayed dry. The drying process operated perfectly, but the product was somewhat hygroscopic.

We prefer the process exemplified in Examples I and II of heating under alkaline conditions to hydrolyze and to reduce the ammonia content (preferably to the 0.01–0.05% range or below) preferably under vacuum to speed up the removal of ammonia and preferably at low temperature to avoid cooked flavor development and then neutralizing and spraying to dry. Additives such as ascorbic acid may be added during the heating step. We have usually diluted the mixture before neutralizing but it appears that this step may not be necessary.

In hydrolyzing the end liquor with alkali, we prefer to add sufficient alkali to adjust the pH to one of from 10.7 to 10.8 although obviously those limits, though advantageous, are not absolute. We prefer during the hydrolyzing step to heat the mixture in order both to aid the hydrolyzing and to drive off excess ammonia. In so heating, we prefer to heat to a temperature in the range of 100–175° F. although again such limits, although advantageous, are not absolute. Neutralization of the hydrolyzed end liquor is advantageous for the reasons previously pointed out. The neutralization should preferably be to a pH of from 5.5 to 5.6, although again, such limits are obviously not absolute.

It is to be understood that the above described embodiments of our invention are for the purpose of illustration only and various changes may be made therein without departing from the spirit and scope of our invention.

We claim:

1. A process of conditioning and drying the end liquor remaining after the separation of glutamic acid in the process of manufacture of glutamic acid from wheat gluten by hydrolysis which comprises rehydrolyzing said end liquor by alkali; neutralizing the rehydrolyzed end liquor; and spray drying the neutralized end liquor.

2. A process of conditioning and drying the end liquor remaining after the separation of glutamic acid in the process of manufacturing glutamic acid from wheat gluten by hydrolysis which comprises mixing with said end liquor an alkali in quantity sufficient to adjust the pH thereof to a pH of from 10.7 to 10.8; warming the mixture to a temperature of from 100–175° F. for a period of from 8–20 hours to rehydrolyze and remove free ammonia; neutralizing the rehydrolyzed end liquor by mixing therewith acid sufficient to lower the pH thereof to from 5.5 to 5.6; and spray drying the neutralized end liquor.

3. A process of conditioning and drying the end liquor remaining after the separation of glutamic acid in the process of manufacturing glutamic acid from wheat gluten by hydrolysis which comprises mixing with said end liquor an alkali in quantity sufficient to adjust the pH thereof to a pH of from 10.7 to 10.8; warming the mixture to a temperature of about 140° F. for a period of approximately 14 hours to rehydrolyze and remove free ammonia; neutralizing the rehydrolyzed end liquor by mixing therewith acid sufficient to lower the pH thereof to from 5.5 to 5.6; and spray drying the neutralized end liquor.

4. A process of conditioning and drying the end liquor remaining after the separation of glutamic acid in the process of manufacturing glutamic acid from wheat gluten by hydrolysis which comprises mixing with said end liquor an alkali sufficient to adjust the pH thereof to a pH of 10.8; warming the mixture to a temperature of from 100–175° F. for a period of from 8–20 hours to rehydrolyze; diluting the mixture with fresh water; neutralizing the mixture by mixing therewith acid sufficient to lower the pH thereof to from 5.5 to 5.6; and spraying to dry.

5. A process of conditioning and drying the end liquor remaining after the separation of glutamic acid in the process of manufacturing glutamic acid from wheat gluten by hydrolysis which comprises mixing with said end liquor an alkali sufficient to adjust the pH thereof to a pH of from 10.7 to 10.8; warming the mixture to a temperature of from 100–175° F. for a period of from 8–20 hours to rehydrolyze; diluting the mixture with fresh water to a concentration of approximately 41% dry substance; neutralizing the mixture by mixing therewith acid sufficient to lower the pH thereof to from 5.5 to 5.6; and spraying to dry.

6. A process of producing a food product for use as an adjunct in dry soup, gravy mixes, spice formulations, and so forth, which comprises separating glutamic acid from wheat gluten by hydrolysis, rehydrolyzing the end liquor remaining after the separation of said glutamic acid with an alkali, neutralizing the rehydrolyzed end liquor; and spray drying the neutralized end liquor.

7. A process of producing a food product for use as an adjunct in dry soup, gravy mixes, spice formulations and so forth, which comprises separating glutamic acid from wheat gluten by acid hydrolysis, treating the end liquor remaining after the separation of said glutamic acid by mixing with said end liquor an alkali in a quantity sufficient to adjust the pH to a pH of from 10.7 to 10.8, and warming the mixture to a temperature of about 140° F. for a period of approximately 14 hours to rehydrolyze and remove the free ammonia; neutralizing the rehydrolyzed end liquor by mixing therewith acid sufficient to lower the pH thereof from 5.5 to 5.6; and spray drying the neutralized end liquor.

8. A process of producing a food product for use as an adjunct in dry soup, gravy mixes, spice formulations and so forth, which comprises separating glutamic acid from wheat gluten by hydrolysis; mixing with the end liquor remaining after the separation of said glutamic acid an alkali sufficient to adjust the pH thereof to a pH of from 10.7 to 10.8; warming the mixture to a temperature of from 100–175° F. for a period of from 8–20 hours to rehydrolyze; diluting the mixture with fresh water to a concentration of approximately 41% dry substance; neutralizing the mixture by mixing therewith acid sufficient to lower the pH thereof to from 5.5 to 5.6; and spraying to dry.

9. A process for producing a food product for use as an adjunct in dry soup, gravy mixes, spice formulations and so forth, which comprises separating glutamic acid from wheat gluten by acid hydrolysis; mixing with the end liquor remaining after the separation of said glutamic acid an alkali sufficient to adjust the pH thereof to a pH of 10.8; warming the mixture to a temperature of about 140° F. for a period of about 14 hours to rehydrolyze; diluting the mixture with fresh water to a concentration of approximately 41% dry substance; neutralizing the mixture by mixing therewith acid sufficient to lower the pH thereof to from 5.5 to 5.6; and spraying to dry.

References Cited in the file of this patent

UNITED STATES PATENTS

| | | |
|---|---|---|
| 1,032,201 | Graf | July 9, 1912 |
| 1,035,591 | Ikeda et al. | Aug. 13, 1912 |
| 1,992,462 | Barnett | Feb. 26, 1935 |
| 2,434,087 | Weber | Jan. 6, 1948 |